(12) United States Patent
Henseler

(10) Patent No.: US 7,526,534 B2
(45) Date of Patent: Apr. 28, 2009

(54) UNIFIED SYSTEM SERVICES LAYER FOR A DISTRIBUTED PROCESSING SYSTEM

(75) Inventor: David A. Henseler, Maplewood, MN (US)

(73) Assignee: Cassatt Corporation, San Jose, CA (US)

( * ) Notice: Subject to any disclaimer, the term of this patent is extended or adjusted under 35 U.S.C. 154(b) by 1027 days.

(21) Appl. No.: 10/893,136

(22) Filed: Jul. 16, 2004

(65) Prior Publication Data

US 2006/0041644 A1    Feb. 23, 2006

(51) Int. Cl.
*G06F 15/177* (2006.01)
(52) U.S. Cl. ........................... 709/220; 717/168
(58) Field of Classification Search .............. 709/220, 709/202
See application file for complete search history.

(56) References Cited

U.S. PATENT DOCUMENTS

| | | | | |
|---|---|---|---|---|
| 6,145,096 | A * | 11/2000 | Bereiter et al. ................ | 714/25 |
| 6,681,282 | B1 * | 1/2004 | Golden et al. ............... | 710/302 |
| 6,711,693 | B1 * | 3/2004 | Golden et al. ............... | 713/400 |
| 2003/0033415 | A1 * | 2/2003 | Graylin et al. .............. | 709/229 |
| 2004/0049573 | A1 | 3/2004 | Olmstead et al. | |
| 2004/0103166 | A1 | 5/2004 | Bae et al. | |
| 2004/0122741 | A1 * | 6/2004 | Sidman ........................ | 705/26 |
| 2004/0205148 | A1 | 10/2004 | Bae et al. | |
| 2005/0080883 | A1 | 4/2005 | Nurminen et al. | |
| 2005/0132349 | A1 * | 6/2005 | Roberts et al. ............... | 717/168 |
| 2005/0149847 | A1 * | 7/2005 | Chandler ...................... | 715/500 |
| 2005/0203968 | A1 * | 9/2005 | Dehghan et al. ............ | 707/203 |
| 2006/0015505 | A1 | 1/2006 | Henseler et al. | |

OTHER PUBLICATIONS

HP XC System Software, System Overview, Hewlett-Packard Company, Version 1.0, Dec. 2003, pp. 1-46.*
Notification of Transmittal of the International Preliminary Report on Patentability for corresponding patent application No. PCT/US2005/025190, mailed Jul. 20, 2006, 13 pages.
International Search Report and Written Opinion, dated Nov. 22, 2005, for corresponding PCT Application No. PCT/US2005/025190, 13 pages.
Hewlett Packard HP XC System Software System Overview, Hewlett-Packard Company, Palo Alto, California, XP-002347422, Dec. 2003, 46 pages.

(Continued)

*Primary Examiner*—John Follansbee
*Assistant Examiner*—Saket K Daftuar
(74) *Attorney, Agent, or Firm*—Shumaker & Sieffert, P.A.

(57) ABSTRACT

A distributed processing system is described that employs "role-based" computing. In particular, the distributed processing system is constructed as a collection of computing nodes in which each computing node performs a particular processing role within the operation of the overall distributed processing system. Each of the computing nodes includes a conventional operating system, such as the Linux operating system, and includes a plug-in software module to provide a distributed memory operating system that employs the role-based computing techniques. The plug-in module provides seamless inter-process communication mechanisms and a distributed file system within the operating system services provided by each of the computing nodes, thereby allowing the computing nodes to cooperate and implement processing services of the overall distributed processing system.

20 Claims, 12 Drawing Sheets

OTHER PUBLICATIONS

Rajkumar Buyya et al., "Single System Image (SSI)," The International Journal of High Performance Computing Applications, vol. 15, No. 2, XP-002347733, 2001, pp. 124-135.

Manoj Pillai et al., "CSAR: Cluster Storage with Adaptive Redunancy," Proceedings of the 2003 International Conference on Parallel Processing (ICPP'03), XP-0010664172, Oct. 6, 2003, pp. 223-230.

Philip H. Carns et al., "PVFS: A Parallel File System for Linux Clusters," XP-002347484, 2000, pp. 1-13.

* cited by examiner

UNIFIED SYSTEM SERVICES LAYER FOR A DISTRIBUTED PROCESSING SYSTEM

TECHNICAL FIELD

The invention relates to distributed processing systems and, more specifically, to multi-node computing systems.

BACKGROUND

Distributed computing systems are increasingly being utilized to support high performance computing applications. Typically, distributed computing systems are constructed from a collection of computing nodes that combine to provide a set of processing services to implement the high performance computing applications. Each of the computing nodes in the distributed computing system is typically a separate, independent computing system interconnected with each of the other computing nodes via a communications medium, e.g., a network.

Conventional distributed computing systems often encounter difficulties in scaling computing performance as the number of computing nodes increases. Scaling difficulties are often related to inter-device communication mechanisms, such as input/output (I/O) and operating system (OS) mechanism, used by the computing nodes as they perform various computational functions required within distributed computing systems. Scaling difficulties may also be related to the complexity of developing and deploying application programs within distributed computing systems.

Existing distributed computing systems containing interconnected computing nodes often require custom development of operating system services and related processing functions. Custom development of operating system services and functions increases the cost and complexity of developing distributed systems. In addition, custom development of operating system services and functions increases the cost and complexity of development of application programs used within distributed systems.

Moreover, conventional distributed computing systems often utilize a centralized mechanism for managing system state information. For example, a centralized management node may handle allocation of process and file system name space. This centralized management scheme often further limits the ability of the system to achieve significant scaling in terms of computing performance.

SUMMARY

In general, the invention relates to a distributed processing system that employs "role-based" computing. In particular, the distributed processing system is constructed as a collection of computing nodes in which each computing node performs one or more processing roles within the operation of the overall distributed processing system.

The various computing roles are defined by a set of operating system services and related processes running on a particular computing node used to implement the particular computing role. As described herein, a computing node may be configured to automatically assume one or more designated computing roles at boot time at which the necessary services and processes are launched.

As described herein, a plug-in software module (referred to herein as a "unified system services layer") may be used within a conventional operating system, such as the Linux operating system, to provide a general purpose, distributed memory operating system that employs role-based computing techniques. The plug-in module provides a seamless interprocess communication mechanism within the operating system services provided by each of the computing nodes, thereby allowing the computing nodes to cooperate and implement processing services of the overall system.

In addition, the unified system services layer ("USSL") software module provides for a common process identifier (PID) space distribution that permits any process running on any computing node to determine the identity of a particular computing node that launched any other process running in the distributed system. More specifically, the USSL module assigns a unique subset of all possible PIDs to each computing node in the distributed processing system for use when the computing node launches a process. When a new process is generated, the operating system executing on the node selects a PID from the PID space assigned to the computing node launching the process regardless of the computing node on which the process is actually executed. Hence, a remote launch of a process by a first computing node onto a different computing node results in the assignment of a PID from the first computing node to the executing process. This technique maintains global uniqueness of process identifiers without requiring centralized allocation. Moreover, the techniques allow the launching node for any process running within the entire system to easily be identified. In addition, inter-process communications with a particular process may be maintained through the computing node that launches a process, even if the launched process is located on a different computing node, without need to discover where the remote process was actually running.

The USSL module may be utilized with the general-purpose operating system to provide a distributed parallel file system for use within the distributed processing system. As described herein, file systems associated with the individual computing nodes of the distributed processing system are "projected" across the system to be available to any other computing node. More specifically, the distributed parallel file system presented by the USSL module allows files and a related file system of one computing node to be available for access by processes and operating system services on any computing node in the distributed processing system. In accordance with these techniques, a process executing on a remote computing node inherits open files from the process on the computing node that launched the remote process as if the remote processes were launched locally.

In one embodiment, the USSL module stripes the file system of designated input/output (I/O) nodes within the distributed processing system across multiple computing nodes to permit more efficient I/O operations. Data records that are read and written by a computing node to a file system stored on a plurality of I/O nodes are processed as a set of concurrent and asynchronous I/O operations between the computing node and the I/O nodes. The USSL modules executing on the I/O nodes separate data records into component parts that are separately stored on different I/O nodes as part of a write operation. Similarly, a read operation retrieves the plurality of parts of the data record from separate I/O nodes for recombination into a single data record that is returned to a process requesting the data record be retrieved. All of these functions of the distributed file system are performed within the USSL plug-in module added to the operating system of the computing nodes. In this manner, a software process executing on one of the computing nodes does not recognize that the I/O operation involves remote data retrieval involving a plurality of additional computing nodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
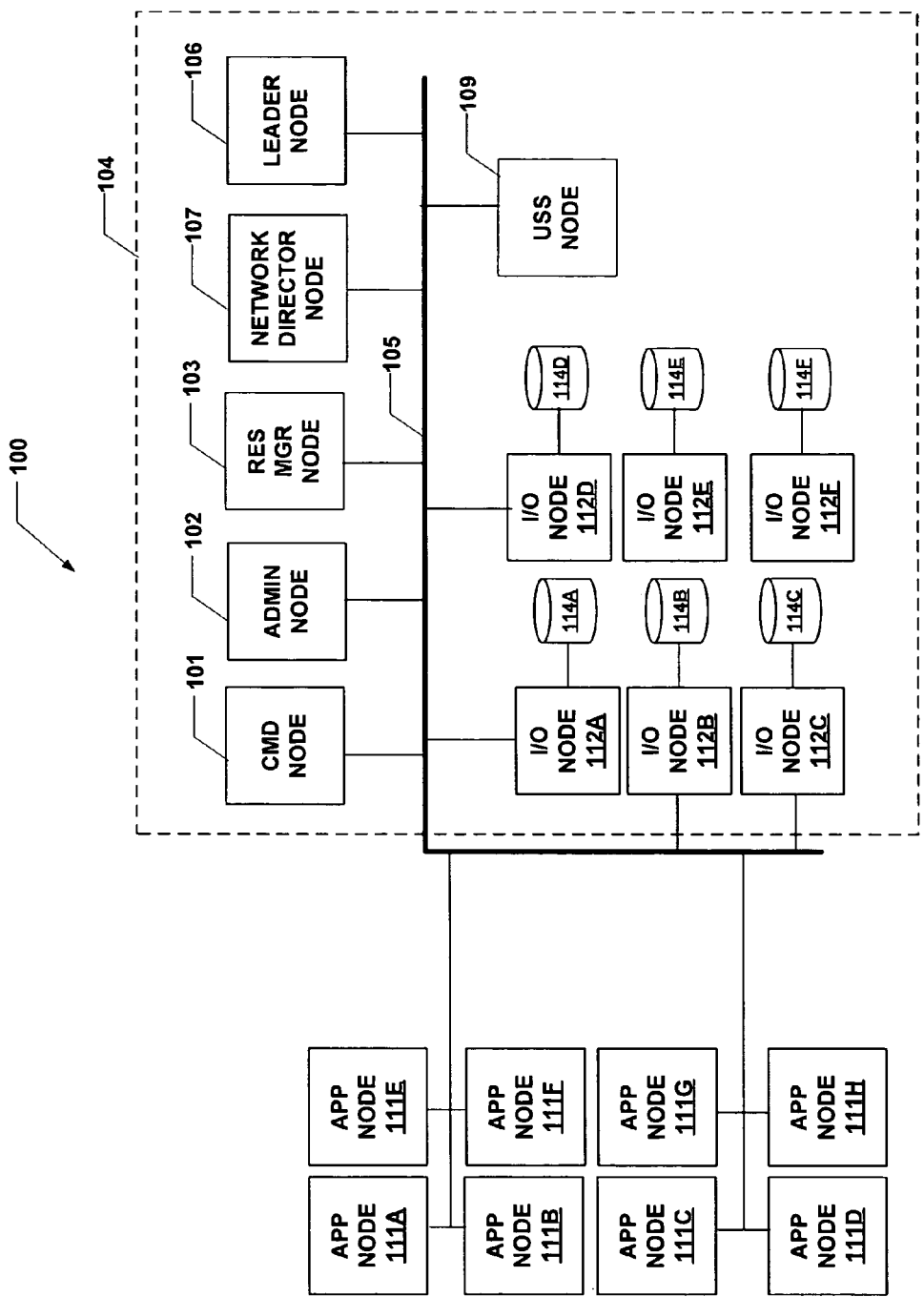
FIG. 1 is a block diagram illustrating a distributed processing system constructed as a cluster of computing nodes in which each computing node performs a particular processing role within the distributed system.

FIG. 1 is a block diagram illustrating a distributed computing system 100 constructed from a collection of computing nodes in which each computing node performs a particular processing role within the distributed system according to the present invention. According to one embodiment, distributed computing system 100 uses role-based node specialization, which dedicates subsets of nodes to specialized roles and allows the distributed system to be organized into a scalable hierarchy of application and system nodes. In this manner, distributed computing system 100 may be viewed as a collection of computing nodes operating in cooperation with each other to provide high performance processing.

The collection of computing nodes, in one embodiment, includes a plurality of application nodes 111A-111H (each labeled "APP NODE" on FIG. 1) interconnected to a plurality of system nodes 104. Further, system nodes 104 include a plurality of input/output nodes 112A-112F (each labeled "I/O NODE") and a plurality of mass storage devices 114A-114F coupled to I/O nodes 12. In one embodiment, system nodes 104 may further include a command node 101 (labeled "CMD NODE"), an administration node 102 (labeled "ADMIN NODE"), and a resource manager node 103 (labeled "RES MGR NODE"). Additional system nodes 104 may also be included within other embodiments of distributed processing system 100. As illustrated, the computing nodes are connected together using a communications network 105 to permit internode communications as the nodes perform interrelated operations and functions.

Distributed processing system 100 operates by having the various computing nodes perform specialized functions within the entire system. For example, node specialization allows the application nodes 111A-111H (collectively, "application nodes 111") to be committed exclusively to running user applications, incurring minimal operating system overhead, thus delivering more cycles of useful work. In contrast, the small, adjustable set of system nodes 104 provides support for system tasks, such as user logins, job submission and monitoring, I/O, and administrative functions, which dramatically improve throughput and system usage.

In one embodiment, all nodes run a common general-purpose operating system. One examples of a general-purpose operating system is the Windows™ operating system provided by Microsoft Corporation. In some embodiment, the general-purpose operating system may be a lightweight kernel, such as the Linux kernel, which is configured to optimize the respective specialized node functionality and that provides the ability to run binary serial code from a compatible Linux system. As further discussed below, a plug-in software module (referred to herein as a "unified system services layer") is used in conjunction with the lightweight kernel to provide the communication facilities for distributed applications, system services and I/O.

Within distributed computing system 100, a computing node, or node, refers to the physical hardware on which the distributed computing system 100 runs. Each node includes one or more programmable processors for executing instructions stored on one or more computer-readable media. A role refers to the system functionality that can be assigned to a particular computing node. As illustrated in FIG. 1, nodes are divided into application nodes 111 and system nodes 104. In general, application nodes 111 are responsible for running user applications launched from system nodes 104. System nodes 104 provide the system support functions for launching and managing the execution of applications within distributed system 100. On larger system configurations, system nodes 104 are further specialized into administration nodes and service nodes based on the roles that they run.

Application nodes 111 may be configured to run user applications launched from system nodes 104 as either batch or interactive jobs. In general, application nodes 111 make up the majority of the nodes on distributed computing system 100, and provide limited system daemons support, forwarding I/O and networking requests to the relevant system nodes when required. In particular, application nodes 111 have access to I/O nodes 112 that present mass storage devices 114 as shared disks. Application nodes 111 may also support local disks that are not shared with other nodes.

The number of application nodes 111 is dependent on the processing requirements. For example, distributed processing system 100 may include 8 to 512 application nodes or more. In general, an application node 111 typically does not have any other role assigned to it.

System nodes 104 provide the administrative and operating system services for both users and system management. System nodes 104 typically have more substantial I/O capabilities than application nodes 111. System nodes 104 can be configured with more processors, memory, and ports to a high-speed system interconnect.

To differentiate a generic node into an application node 111 or system node 104, a "node role" is assigned to it, thereby dedicating the node to provide the specified system related functionality. A role may execute on a dedicated node, may share a node with other roles, or may be replicated on multiple nodes. In one embodiment, a computing node may be configured in accordance with a variety of node roles, and may function as an administration node 102, application nodes 111, command node 101, I/O nodes 112, a leader node 106, a network director node 107, a resources manager node 103, and/or a Unix System Services (USS) USS node 109. Distributed processing system 100 illustrates multiple instances of several of the roles, indicating that those roles may be configured to allow system 100 to scale so that it can adequately handle the system and user workloads. These system roles are described in further detail below, and typically are configured so that they are not visible to the user community, thus preventing unintentional interference with or corruption of these system functions.

The administration functionality is shared across two types of administration roles: administration role and leader role. The combination of administration and leader roles is used to allow the administrative control of large systems to easily scale. Typically, only one administration role is configured on a system, while the number of leader roles is dependent on the number of groups of application nodes in the system. The administration role along with the multiple leader roles provides the environment where the system administration tasks are executed.

If a system node 104 is assigned an administration role, it is responsible for booting, dumping, hardware/health monitoring, and other low-level administrative tasks. Consequently, administration node 102 provides a single point of administrative access for system booting, and system control and monitoring. With the exception of the command role, this administration role may be combined with other system roles on a particular computing node.

Each system node 104 with the leader role (e.g., leader node 106) monitors and manages a subset of one or more nodes, which are referred to as a group. The leader role is responsible for the following: discovering hardware of the group, distributing the system software to the group, acting as the gateway between the system node with the administration role and the group, and monitoring the health of the group e.g., in terms of available resources, operational status and the like.

A leader node facilitates scaling of the shared root file system, and offloads network traffic from the service node with the administration role. Each group requires a leader node which monitors and manages the group. This role can be combined with other system roles on a node. In some cases, it may be advisable to configure systems with more than 16 application nodes into multiple groups.

The system node 104 with the administration role contains a master copy of the system software. Each system node 104 with a leader role redistributes this software via an NFS-mounted file transfer, and is responsible for booting the application nodes 111 for which it is responsible.

The resource management, network director, I/O, and command roles directly or indirectly support users and the applications that are run by the users. Typically, only one instance of the network director and resource manager roles are configured on a system. The number of command roles can be configured such that user login and the application launch workload are scaled on system 100. The need for additional system nodes with an I/O role is optional, depending on the I/O requirements of the specific site. Multiple instances of the I/O roles can be configured to allow system 100 to scale to efficiently manage a very broad range of system and user workloads.

Command node 101 provides for user logins, and application builds, submission, and monitoring. The number of command roles assigned to system 100 is dependent on the processing requirements. At least one command role is usually always configured within system 100. With the exception of the administration role, this role can be combined with other system roles on a node.

In general, I/O nodes 112 provide for support and management of file systems and disks, respectively. The use of the I/O roles is optional, and the number of I/O roles assigned to a system is dependent on the I/O requirements of the customer's site. An I/O role can be combined with other system roles on a node. However, a node is typically not assigned both the file system I/O and network I/O roles. In some environments, failover requirements may prohibit the combination of I/O roles with other system roles.

Network director node 107 defines the primary gateway node on distributed processing system 100, and handles inbound traffic for all nodes and outbound traffic for those nodes with no external connections. Typically, one network director role is configured within distributed processing system 100. This role can be combined with other system roles on a node.

Resources manager node 103 defines the location of the system resource manager, which allocates processors to user applications. Typically one resource manager role is configured within distributed processing system 100. This role can be combined with other system roles on a node. A backup resource manager node (not shown) may be included within system 100. The backup resource manager node may take over resource management responsibility in the event a primary resource manager node fails.

An optional USS node 109 provides the Unix System Services (USS) service on a node when no other role includes this service. USS services are a well-know set of services and may be required by one or more other Unix operating system services running on a computing node. Inclusion of a USS computing role on a particular computing node provides these USS services when needed to support other Unix services. The use of the USS role is optional and is intended for use on non-standard configurations only. The number of USS roles assigned to distributed processing system 100 is dependent on the requirements of the customer's site. This role can be combined with other system roles on a node, but is redundant for all but the admin, leader, and network director roles.

While many of the system nodes 104 discussed above are shown using only a single computing node to support its functions, multiple nodes present within system 100 may support these roles, either in a primary or backup capacity. For example, command node 101 may be replicated any number of times to support additional users or applications. Administration node 102 and resource manager node 103 may be replicated to provide primary and backup nodes, thereby gracefully handling a failover in the event the primary node fails. Leader node 106 may also be replicated any number of times as each leader node 106 typically supports a separate set of application nodes 111.

Figure 2:
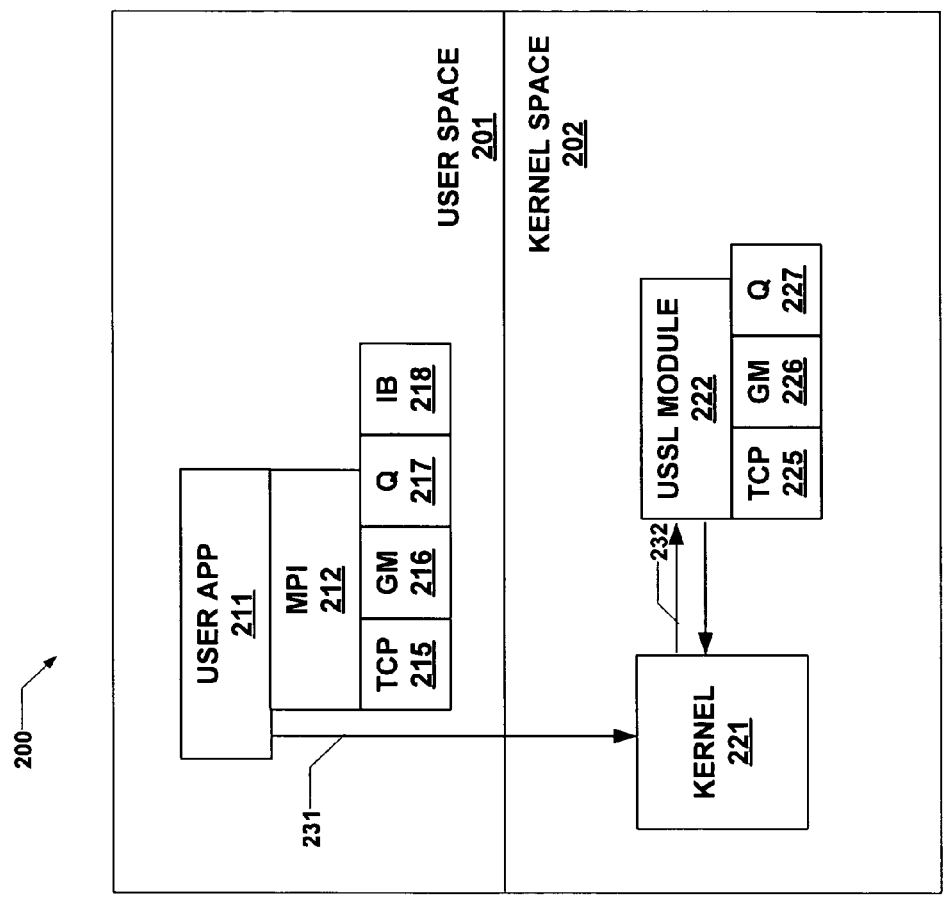
FIG. 2 is a block diagram illustrating an example computing node within a cluster of computing nodes according to the present invention.

FIG. 2 is a block diagram illustrating an example embodiment of one of the computing nodes of distributed processing system 100 (FIG. 1), such as one of application nodes 111 or system nodes 104. In the illustrated example of FIG. 2, computing node 200 provides an operating environment for executing user software applications as well as operating system processes and services. User applications and user processes are executed within a user space 201 of the execution environment. Operating system processes associated with an operating system kernel 221 are executed within kernel space 202. All node types present within distributed computing system 100 provide both user space 201 and kernel space 202, although the type of processes executing within may differ depending upon role the node type.

User application 211 represents an example application executing within user space 201. User application interacts with a messaging passage interface (MPI) 212 to communicate with remote processes through hardware interface modules 215-217. Each of these interface modules 215-217 provide interconnection using a different commercially available interconnect protocol. For example, TCP module 215 provides communications using a standard TCP transport layer. Similarly, GM module 216 permits communications using a Myrinet transport layer, from Myricom, Inc. of Arcadia, Calif., and Q module 217 permits communications using a QsNet systems transport layer, from Quadrics Supercomputers World, Ltd. of Bristol, United Kingdom. Hardware interface modules 215-217 are exemplary and other types of interconnects may be supported within distributed processing system 100.

User application 211 also interacts with operating system services within kernel space 202 using system calls 231 to kernel 221. Kernel 221 provides an application programming interface (API) for receiving system calls for subsequent processing by the operating system. System calls that are serviced locally within computing node 200 are processed within kernel 221 to provide user application 211 requested services.

For remote services, kernel 221 forwards system calls 232 to USSL module 222 for processing. USSL module 222 communicates with a corresponding USSL module within a different computing node within distributed processing system 100 to service the remote system calls 232. USSL module 222 communicates with remote USSL modules over one of a plurality of supported transport layer modules 225-227. These transport layer modules 225-227 include a TCP module 225, a GM module 226 and a Q module 227 that each support a particular communications protocol. Any other commercially available communications protocol may be used with its corresponding communications transport layer module without departing from the present invention.

In one example embodiment, kernel 221 is the Linux operating system, and USSL module 222 is a plug-in module that provides additional operating system services. For example, USSL module 222 implements a distributed process space, a distributed I/O space and a distributed process ID (PID) space as part of distributed processing system 100. In addition, USSL module 222 provides mechanisms to extend OS services to permit a process within computing node 200 to obtain information regarding processes, I/O operations and CPU usage on other computing nodes within distributed processing system 100. In this manner, USSL module 222 supports coordination of processing services within computing nodes within larger distributed computing systems.

Figure 3:
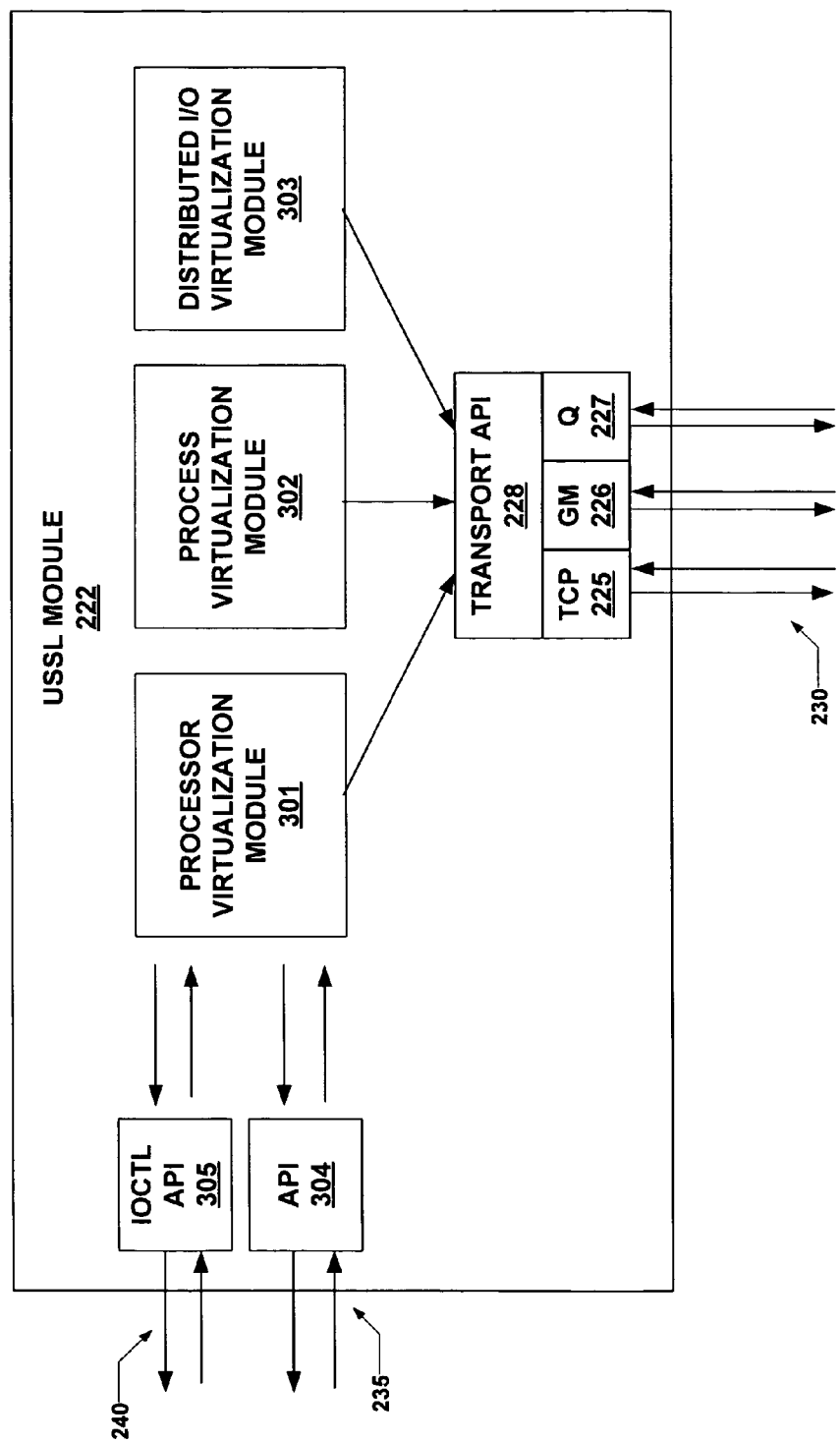
FIG. 3 is a block diagram illustrating an example unified system services module that is part of an operating system within a computing node of a distributed processing system according to the present invention.

FIG. 3 is a block diagram illustrating an example embodiment of USSL module 222 (FIG. 2) in further detail. In the exemplary embodiment, USSL module 222 includes a processor virtualization module 301, process virtualization module 302, distributed I/O virtualization module 303, transport API module 228, a kernel common API module 304, and I/O control (IOCTL) API module 305.

Processor virtualization module 301 provides communications and status retrieval services between computing node 200 (FIG. 2) and other computing nodes within distributed processing system 100 associated with CPU units with these computing nodes. Processor virtualization module 301 provides these communication services to make the processors of the computing nodes within distributed computing system 100 appear to any process executing within system 100 as a single group of available processors. As a result, all of the processors are available for use by applications deployed within system 100. User applications may, for example, request use of any of these processors through system commands, such as an application launch command or a process spawn command.

Process virtualization module 302 provides communications and status retrieval services of process information for software processes executing within other computing nodes within distributed processing system 100. This process information uses PIDs for each process executing within distributed processing system 100. Distributed processing system 100 uses a distributed PID space used to identify processes created and controlled by each of the computing nodes. In particular, in one embodiment, each computing node within distributed processing system 100 is assigned a set of PIDs. Each computing node uses the assigned set when generating processes within distributed processing system 100. Computing node 200, for example, will create a process having a PID within the set of PIDs assigned to computing node 200 regardless of whether the created process executes on computing node 200 or whether the created process executes remotely on a different computing node within distributed processing system 100.

Because of this particular distribution of PID space, any process executing within distributed processing system 100 can determine the identity of a computing node that created any particular process based on the PID assigned to the process. For example, a process executing on one of application nodes 111 may determine the identity of another one of the application nodes 111 that created a process executing within any computing node in distributed processing system 100. When a process desires to send and receive messages from a given process in distributed processing system 100, a message may be sent to the particular USSL module 222 corresponding to the PID space containing the PID for the desired process. USSL module 222 in this particular computing node may forward the message to the process because USSL module 222 knows where its process is located. Using this mechanism, the control of PID information is distributed across system 100 rather than located within a single node in distributed processing system 100.

Distributed I/O virtualization module 303 provides USSL module 222 communications services associated with I/O operations performed on remote computing nodes within distributed processing system 100. Particularly, distributed I/O virtualization module 303 permits application nodes 111 (FIG. 1) to utilize storage devices 114A-114F (collectively, mass storage devices 114) coupled to I/O nodes 112 (FIG. 1) as if the mass storage devices 114 provided a file system local to application nodes 111.

For example, I/O nodes 112 assigned the "file system I/O" role support one or more mounted file systems. I/O nodes 112 may be replicated to support as many file systems as required, and use local disk and/or disks on the nodes for file storage.

I/O nodes 112 with the file system I/O role may have larger processor counts, extra memory, and more external connections to disk and the hardware interconnect to enhance performance. Multiple I/O nodes 112 with the file system I/O role can be mounted as a single file system on application nodes to allow for striping/parallelization of an I/O request via a USSL module 222.

I/O nodes 112 assigned the "network I/O" role provide access to global NFS-mounted file systems, and can attach to various networks with different interfaces. A single hostname is possible with multiple external nodes, but an external router or single primary external node is required. The I/O path can be classified by whether it is disk or external, and who (or what) initiates the I/O (e.g., the user or the system).

Distributed processing system 100 supports a variety of paths for system and user disk I/O. Although direct access to local volumes on a node is supported, the majority of use is through remote file systems, so this discussion focuses on file system-related I/O. For exemplary purposes, the use of NFS is described herein because of the path it uses through the network. All local disk devices can be used for swap on their respective local nodes. This usage is a system type and is independent of other uses.

System nodes 104 and application nodes 111 may use local disk for temporary storage. The purpose of this local temporary storage is to provide higher performance for private I/O than can be provided across the distributed processing system. Because the local disk holds only temporary files, the amount of local disk space does not need to be large.

Distributed processing system 100 may assume that most file systems are shared and exported through the USSL module 222 or NFS to other nodes. This means that all files can be equally accessed from any node and the storage is not considered volatile. Shared file systems are mounted on system nodes 104.

In general, each disk I/O path starts at a channel connected to one of I/O nodes 112 and is managed by disk drivers and logical volume layers. The data is passed through to the file system, usually to buffer cache. The buffer cache on a Linux system, for example, is page cache, although the buffer cache terminology is used herein because of the relationship to I/O and not memory management. On another embodiment of distributed processing system 100, applications may manage their own user buffers and not depend on buffer cache.

Within application nodes 111, the mount point determines the file system chosen by USSL module 222 for the I/O request. For example, the file system's mount point specifies whether it is local or global. A local request is allowed to continue through the local file system. A request for I/O from a file system that is mounted globally is communicated directly to one of I/O node 112 where the file system is mounted. All processing of the request takes place on this system node, and the results are passed back upon completion to the requesting node and to the requesting process.

Application I/O functions are usually initiated by a request through USSL module 222 to a distributed file system for a number of bytes from/to a particular file in a remote file system. Requests for local file systems are processed local to the requesting application node 111. Requests for global I/O are processed on the one of the I/O nodes where the file system is mounted.

Other embodiments of system 100 provide an ability to manage an application's I/O buffering on a job basis. Software applications that read or write sequentially can benefit from pre-fetch and write-behind, while I/O caching can help programs that write and read data. However, in both these cases, sharing system buffer space with other programs usually results in interference between the programs in managing the buffer space. Allowing the application exclusive use of a buffer area in user space is more likely to result in a performance gain.

Another alternate embodiment of system 100 supports asynchronous I/O. The use of asynchronous I/O allows an application executing on one of application nodes 111 to continue processing while I/O is being processed. This feature is often used with direct non-buffered I/O and is quite useful when a request can be processed remotely without interfering with the progress of the application.

Distributed processing system 100 uses network I/O at several levels. System 100 must have at least one external connection to a network, which should be IP-based. The external network provides global file and user access. This access is propagated through the distributed layers and shared file systems so that a single external connection appears to be connected to all nodes. The system interconnect can provide IP traffic transport for user file systems mounted using NFS.

A distributed file system provided by distributed I/O virtualization module 303 provides significantly enhanced I/O performance. The distributed file system is a scalable, global, parallel file system, and not a cluster file system, thus avoiding the complexity, potential performance limitations, and inherent scalability challenges of cluster file system designs.

The read/write operations between application nodes 111 and the distributed file system are designed to proceed at the maximum practical bandwidth allowed by the combination of system interconnect, the local storage bandwidth, and the file/record structure. The file system supports a single file name space, including read/write coherence, the striping of any or all file systems, and works with any local file system as its target.

The distributed file system is also a scalable, global, parallel file system that provides significantly enhanced I/O performance on the USSL system. The file system can be used to project file systems on local disks, project file systems mounted on a storage area network (SAN) disk system, and re-export a NFS-mounted file system.

Transport API 228 and supported transport layer modules 225-227 provide a mechanism for sending and receiving communications 230 between USSL module 222 and corresponding USSL modules 222 in other computing nodes in distributed processing system 100. Each of the transport layer modules 225-227 provide an interface between a common transport API 228 used by processor virtualization module 301, process virtualization module 302, distributed I/O virtualization module 303 and the various communication protocols supported within computing node 200.

API 304 provides a two-way application programming interface for communications 235 to flow between kernel 221 and processor virtualization module 301, process virtualization module 302, distributed I/O virtualization module 303 within USSL module 222. API module 304 provides mechanisms for the kernel 221 to request operations be performed within USSL module 222. Similarly, API module 304 provides mechanisms for kernel 221 to provide services to the USSL module 222. IOCTL API module 305 provides a similar application programming interface for communications 240 to flow between the kernel 221 and USSL module 222 for I/O operations.

Figure 4:
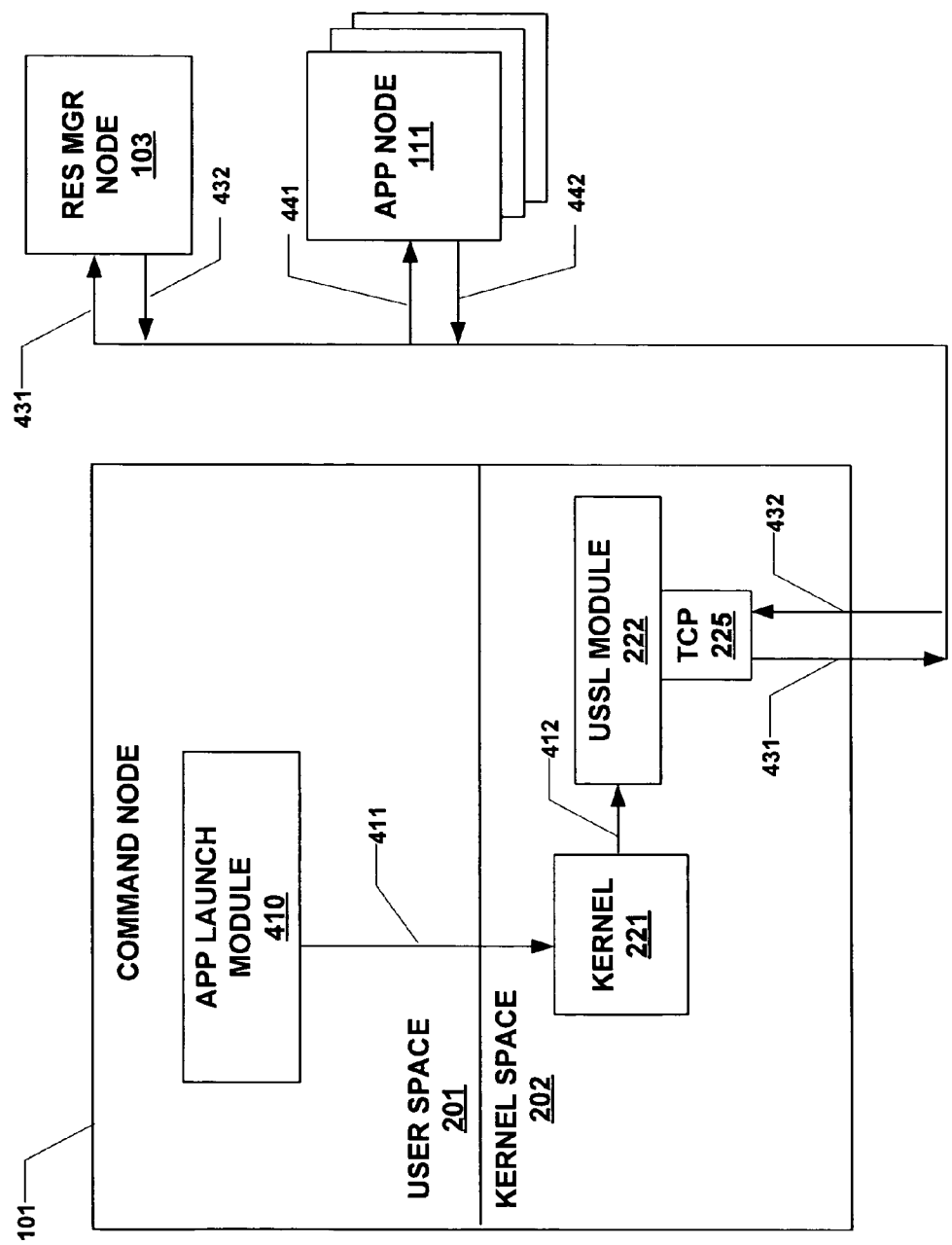
FIG. 4 is a block diagram illustrating a remote application launch operation within a distributed processing system according to the present invention.

FIG. 4 is a block diagram illustrating example execution of a remote application launch operation within distributed processing system 100 according to the present invention. In general, a remote application launch command represents a user command submitted to distributed processing system 100 to launch an application within distributed processing system 100.

Initially, a user or software agent interacts with distributed processing system 100 through command node 101 that provides services to initiate actions for the user within distributed processing system 100. For an application launch operation, command node 101 uses an application launch module 410 that receives the request to launch a particular application and processes the request to cause the application to be launched within distributed processing system 100. Application launch module 410 initiates the application launch operation using a system call 411 to kernel 221 to perform the application launch. Because command node 101 will not launch the application locally as user applications are only executed on application nodes 111, kernel 221 passes the system call 412 to USSL module 222 for further processing.

USSL module 222 performs a series of operations that result in the launching of the user requested application on one or more of the application nodes 111 within distributed processing system 100. First, processor virtualization module 301 (FIG. 3) within USSL module 222 determines the identity of the one or more application nodes 111 on which the application is to be launched. In particular, processor virtualization module 301 sends a CPU allocation request 431 through a hardware interface, shown for exemplary purposes as TCP module 225, to resource manager node 103.

Resource manager node 103 maintains allocation state information regarding the utilization of all CPUs within all of the various computing nodes of distributed processing system 100. Resource manager node 103 may obtain this allocation state information by querying the computing nodes within distributed processing system 100 when it becomes active in a resource manager role. Each computing node in distributed processing system 100 locally maintains its internal allocation state information. This allocation state information includes, for example, the identity of every process executing within a CPU in the node and the utilization of computing resources consumed by each process. This information is transmitted from each computing node to resource manager node 103 in response to its query. Resource manager node 103 maintains this information as processes are created and terminated, thereby maintaining a current state for resource allocation within distributed processing system 100.

Resource manager node 103 uses the allocation state information to determine on which one or more of application nodes 111 the application requested by command node 101 is to be launched. Resource manager node 103 selects one or more of application nodes 111 based on criteria, such as a performance heuristic that may predict optimal use of application nodes 111. For example, resource manager node 103 may select application nodes 111 that are not currently executing applications. If all application nodes 111 are executing applications, resource manager node 103 may use an application priority system to provide maximum resources to higher priority applications and share resources for lower priority applications. Any number of possible prioritization mechanisms may be used.

Once resource manager node 103 determines the identity of one or more application nodes 111 to be used by command node 101, a list of the identified application nodes 111 may be transmitted as a message 432 back to USSL module 222 within command node 101. Processor virtualization module 301 within USSL module 222 of command node 101 uses the list of application nodes 111 to generate one or more remote execute requests 441 necessary to launch the application on the application nodes 111 identified by resource manager node 103. In general, a remote execute request is a standard request operation that specifies that an application is to be launched. The identity of the application may be provided using a file name, including a path name, to an executable file stored on one of the I/O nodes 112.

Processor virtualization module 301 transmits the remote execute requests 441 to each of the one or more application nodes 111 identified by resource manager node 103 to complete the remote application launch operation. Each remote execute request 441 include a PID for use when the application is launched. Each of the application nodes 111 uses the PID provided in the remote execute request 441 in order to properly identify the launching node, command node 101 in this example, as the node creating the process associated with the launch of the application. In other words, the PID provided within remote execute request 441 will be selected by command node 101 from within the PID space allocated to the command node.

Upon creation of one or more software processes corresponding to the launch of the application, each targeted application node 111 returns a response message 442 to process virtualization module 302 to indicate the success or failure of the request. When a process is successfully created, process virtualization module 302 updates a local process information store that contains state information relating to launched application. This information store maintains an identity of the processes created using their PIDs, and related process group IDs and session IDs, as well as an identity of the one of application nodes 111 upon which the process is running. A similar message may be transmitted to resource manager node 103 to indicate that the process is no longer utilizing processing resources within a particular one of the application nodes 111. Resource manager node 103 may use this message to update its allocation state data used when allocating app nodes to process creation requests.

Figure 5:
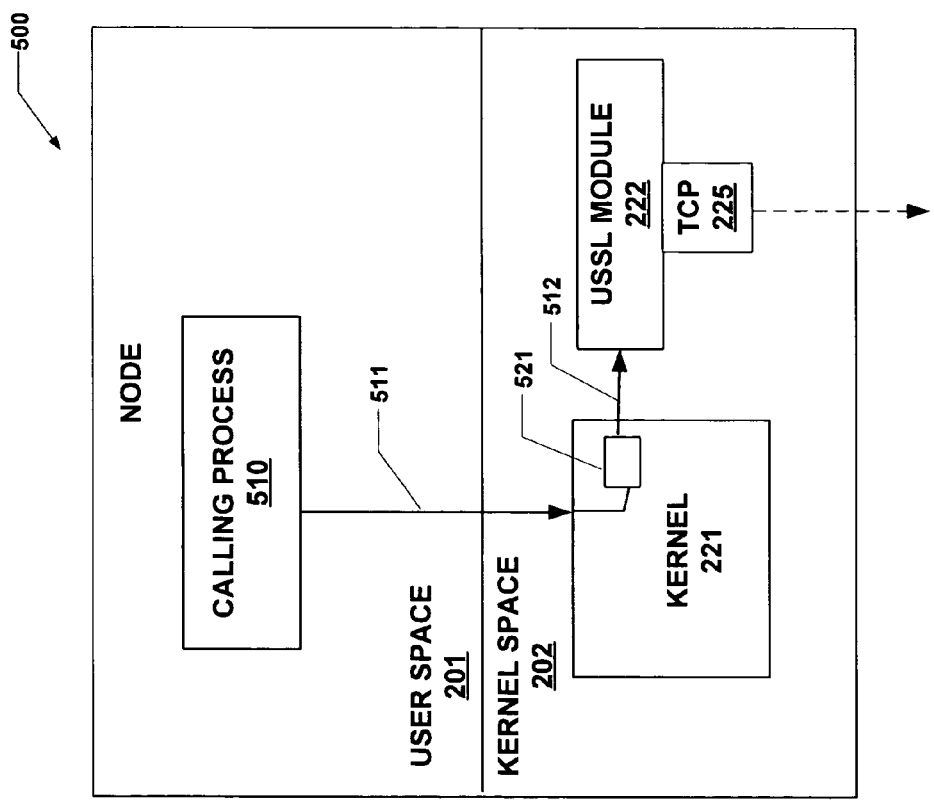
FIG. 5 is a flow chart illustrating an operating system kernel hook utilized within computing nodes within a distributed processing system according to the present invention.

FIG. 5 is a block diagram illustrating the processing of an operating system call 512 from a calling process 510 executing on node 500, which may be any node within distributed processing system 100. In particular, FIG. 5 illustrates the processing of a system call 512 issued by calling process 510 to create (e.g., execute or spawn) a user application process on one or more of application nodes 111.

In general, within all computing nodes within distributed processing system 100, applications executing in user space 201 interact with operating system kernel 221 operating in kernel space 202 through the use of a system call 511. This system call 511 is a procedure call to a defined interface for a particular O/S service. In distributed processing system 100, a subset of these system calls are forwarded as calls 512 by kernel 221 to USSL module 222 to provide a set of services and related operations associated with a collection of computing nodes operating as a distributed computing system. In this manner, USSL module 222 may be used within a conventional operating system, such as the Linux operating system, to provide a general purpose, distributed memory operating system that employs role-based computing techniques.

In the example of FIG. 5, kernel 221 receives system call 511 and determines whether the system call is supported by the kernel or whether the system call needs to be forwarded to the USSL module 222. In contrast, in the application launch example of FIG. 4, kernel 221 forwarded system call 411 to USSL module 222 as all application launch operations are typically performed as remotely executed commands.

In processing other commands, kernel 221 may desire to perform the command locally in some circumstances and remotely in other circumstances. For example, an execute command causes creation of a software process to perform a desired operation. This process may be executed locally within command node 101 or may be executed within one of application nodes 111 of distributed processing system 100. Similarly, other system calls 511 may be performed locally by kernel 221 or forwarded to USSL 222 for remote processing.

In order to determine where the process is to be created, a kernel hook 521 is included within of kernel 221 to make this determination. In general, kernel hook 521 is a dedicated interface that processes all system calls 511 that may be executed in multiple locations. For example, kernel hook 521 processes exec calls and determines whether the process to be created should be created locally or remotely on one of application nodes 111.

To make this determination, kernel hook 521 maintains a list of programs that are to be remotely executed depending upon the identity of calling process 510 that generated system call 511. If the program that is to be executed as part of system call 511 is found on the list of programs maintained by kernel hook 521, the kernel hook issues system call 512 to USSL module 222 for processing. If the program requested in system call 511 is not on the list of programs, kernel hook 521 passes the system call to kernel 221 for processing. Because the list of programs used by kernel hook 521 is different for each calling process 510, control of which system calls are passed to USSL module 222 may be dynamically controlled depending upon the identity of the process making the call.

Figure 6:
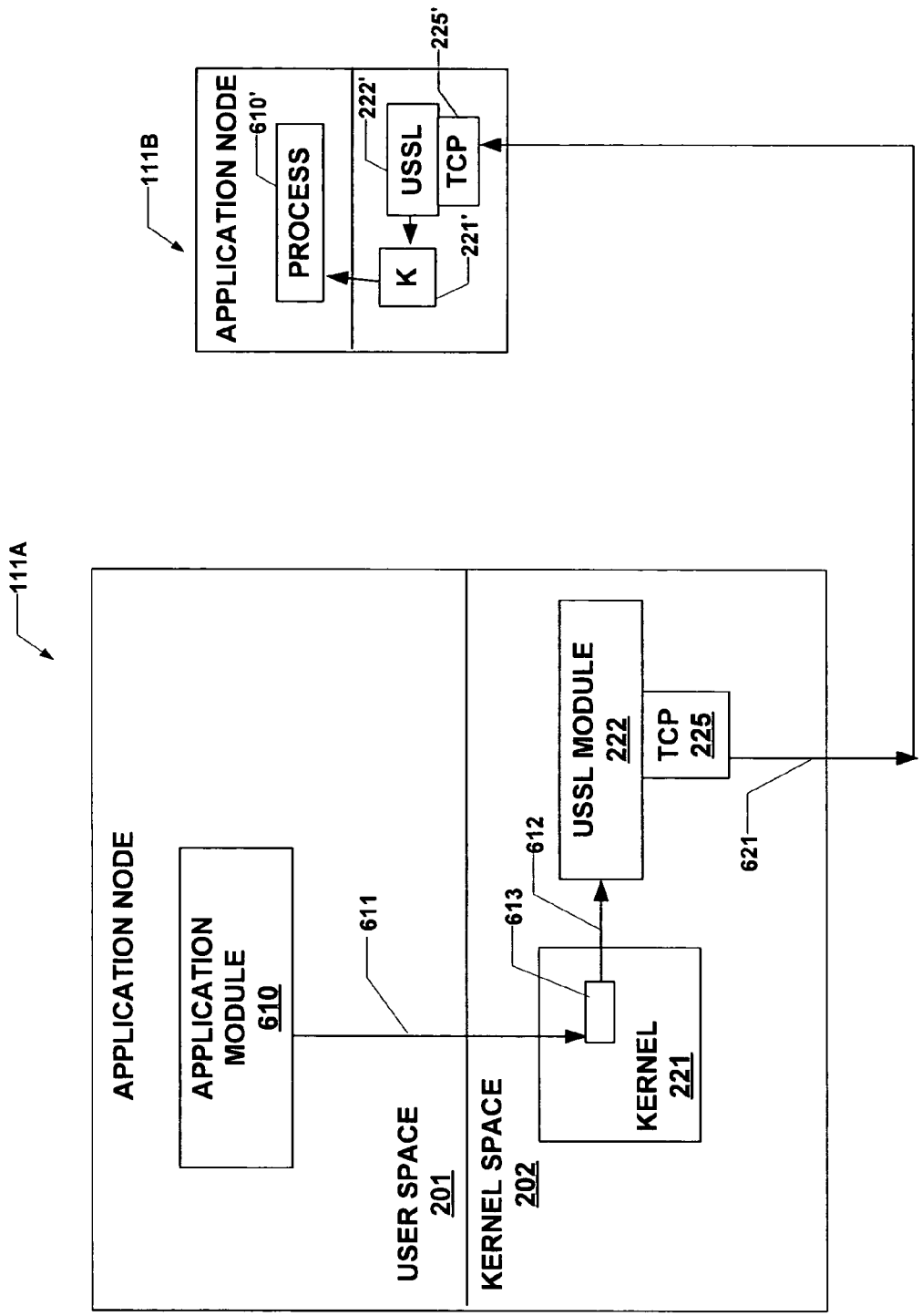
FIG. 6 is a block diagram illustrating an example remote exec operation providing an inherited open file reference within a distributed processing system according to the present invention.

FIG. 6 is a block diagram illustrating an inter-process signaling operation performed by an application node 111A according to the present invention. In distributed processing system 100, transmission of the messages used to perform inter-process signaling is handled by USSL module 222 present within each computing node. When a particular application module 610 executing within application node 111A wishes to send a signal message to a different process 610' executing on another application node 111B, application module 610 initiates the signal by making a signaling system call 611 to kernel hook 613.

Upon receiving system call 611, kernel hook 613 within 221 determines whether the process to be signaled is local using the specified PID. If the signal message is to be sent to a remote process, kernel 221 issues a corresponding signaling message call 612 to USSL module 222 for transmission of the signaling message to the remote application node 111B. Process virtualization module 302 (FIG. 3) within USSL module 222 generates a message 621 that is transmitted to a corresponding USSL module 222' within application node 111B. A process virtualization module within USSL module 222' forwards the signaling message to kernel 221' in application node 111B for ultimate transmission to process 610'. A return message, if needed, is transmitted from process 610' to application module 610 in similar fashion.

In this manner, application module 610 need not know where process 610' is located within distributed processing system 100. Application module 610 may, for example, only know the PID for process 610' to be signaled. In such a situation, USSL module 222 in application node 111A forwards signaling message 621 to the computing node within which the PID for process 610 is assigned. The USSL module 222 within this computing node, via its process virtualization module, identifies the application node on which the process is executing. If process 610' is located on a remote computing node, such as application node 111B, the signaling message is forwarded from application node 111A owning the PID of the process to process 610' for completion of the signaling operation.

Figure 7:
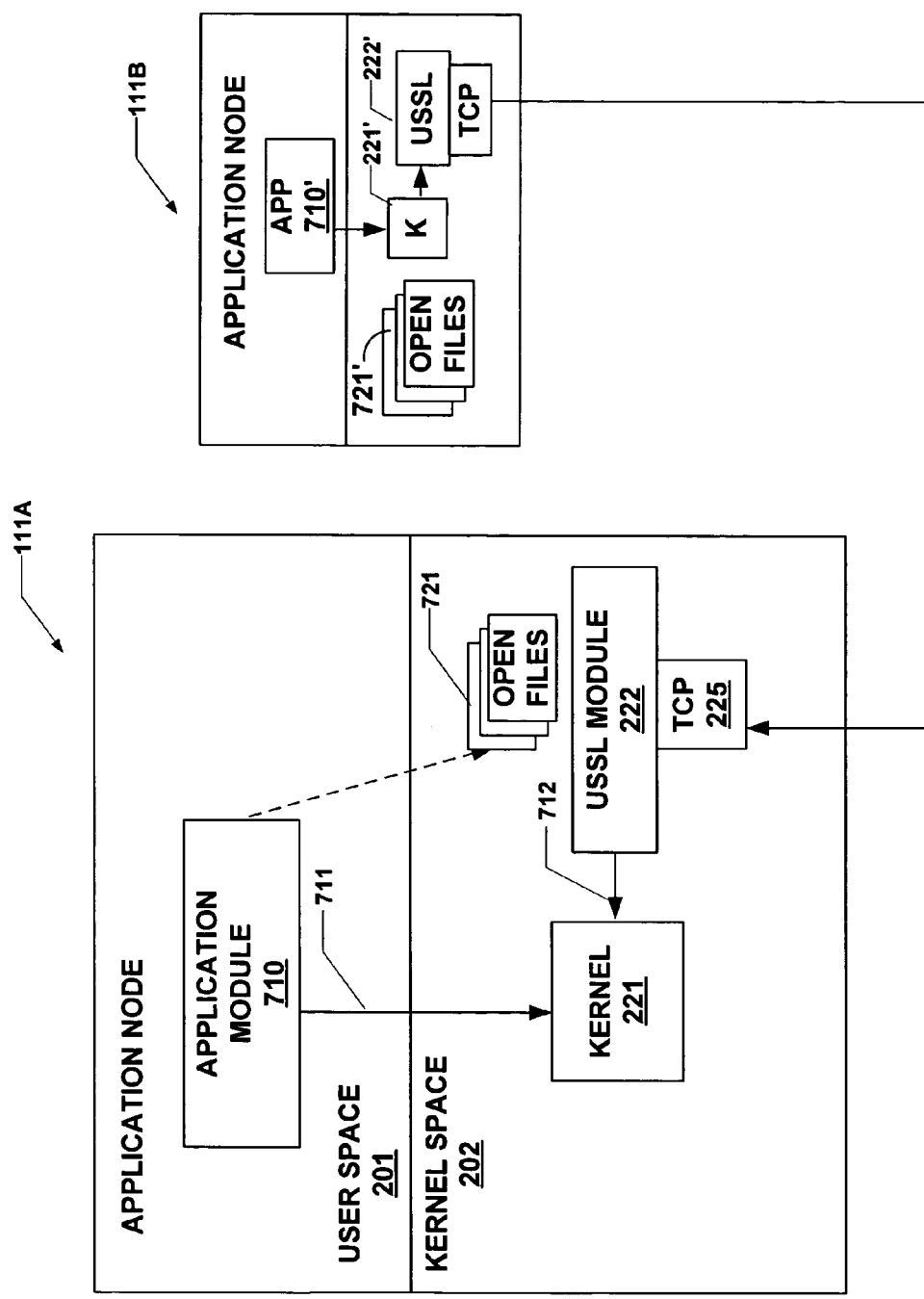
FIG. 7 is a block diagram illustrating an inter-process signaling operation within a distributed processing system according to the present invention.

FIG. 7 is a block diagram illustrating an example of inherited open file references within distributed processing system 100 according to the present invention. In particular, open files 721 associated with the application module 710 are inherited within a remote application 710' created by the exec operation. In embodiments in which LINUX is the operating system running on all computing nodes within distributed processing system 100, open files 721 typically correspond to standard input, standard output, and console files associated with all applications running under UNIX, but includes all open files.

Due to this inheritance, remote application 710' utilizes the same open files 721 located on application node 111A that created remote application 710'. As such, when remote application 710' performs an I/O operation to one of inherited open files 721', the I/O operation is automatically transmitted from application node 111B to application node 111A for completion. In particular, remote application 710' attempts to perform the I/O operation through its kernel 211'. Because these open files 721 are remote to kernel 221', the kernel passes the I/O operation to USSL module 222'. USSL module 222', using its distributed I/O virtualization module 303, forwards the I/O operation request to USSL module 222 within application node 111A. USSL module 222 then makes an I/O call 712 to kernel 221 to perform the appropriate read or write operation to open files 721.

Kernel 221 and kernel 221' map I/O operations to these open files 721 to specific memory address locations within the respective kernels. As such, kernel 221' knows to pass I/O operations at that particular memory address to the USSL module 222' for processing. Kernel 221' does not know or need to know where USSL module 222' ultimately performs the I/O operation. Similarly, kernel 222 receives an I/O request 711 from USSL module 222 with an I/O operation to its particular memory address corresponding to the open files 721. Kernel 221 performs the I/O operation as if the I/O request was made locally rather than remotely through a pair of USSL modules located on different computing nodes. In this manner, the techniques provide for the seamless inheritance of open file references within distributed processing system 100.

Figure 8:
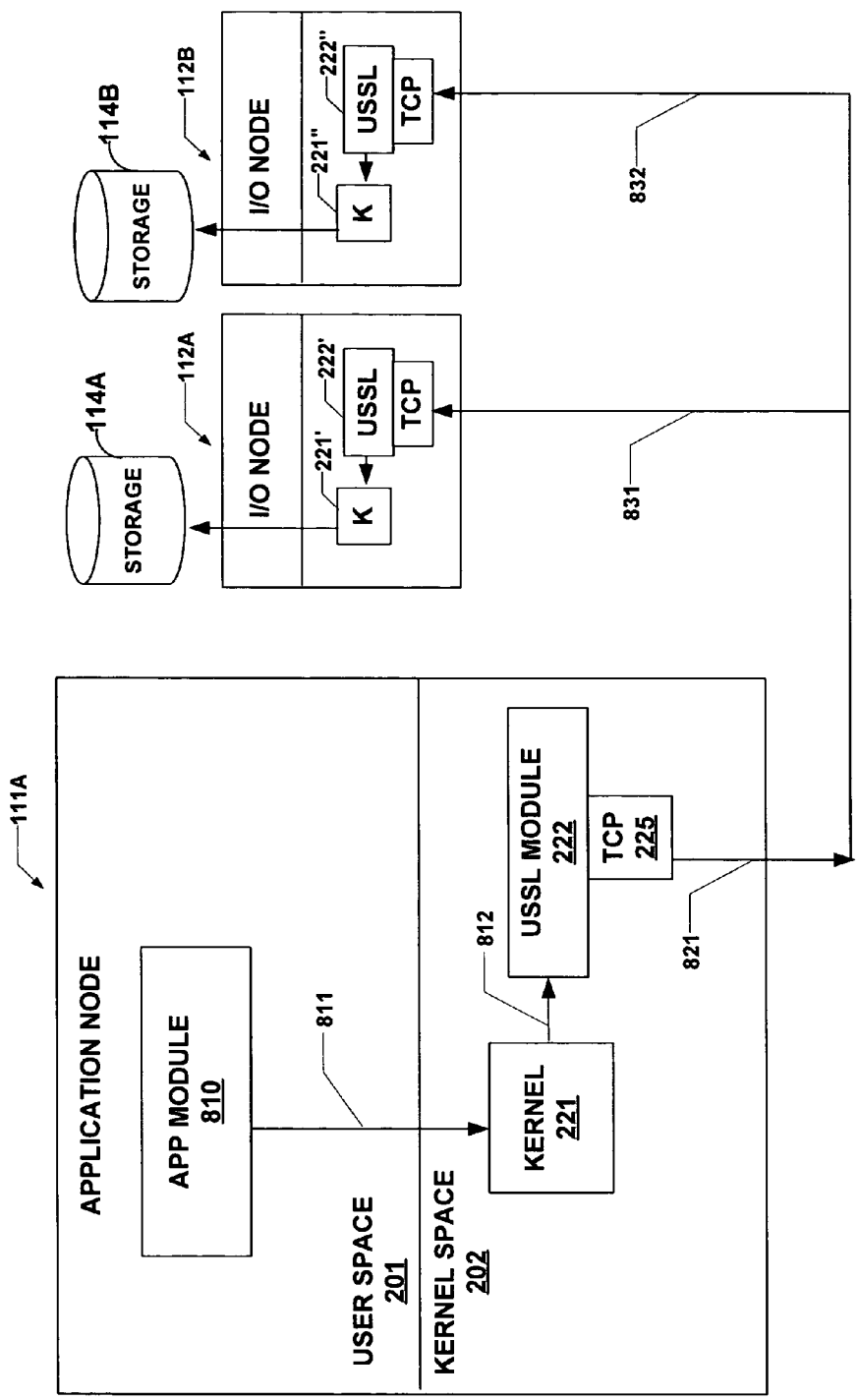
FIG. 8 is a block diagram illustrating a distributed file I/O operation within a distributed processing system according to the present invention.

FIG. 8 is a block diagram illustrating a distributed file I/O operation within a distributed processing system according to the present invention. In this example, application module 810 of application node 111A accesses a file system stored on a plurality of I/O nodes 112A, 112B. These nodes and their respective processing roles provide a cooperative processing environment for applications to operate and perform I/O operations using I/O nodes 112A, 112B.

In general, distributed processing system 100 supports one or more file systems including: (1) a multiple I/O node parallel file system, (2) a non-parallel, single I/O node version of the file system, (3) a global /node file system that provides a view of the file system tree of every node in the system, and (4) a global/gproc file system that provides a view of the processes in the global process space.

In distributed processing system 100, most file systems are typically shared and exported through USSL module 222 executing on each node. The use of shared file systems through USSL module 222 means that all files can be accessed equally from any node in distributed processing system 100, and that storage is not volatile. On system 100, every node has a local root (/) that supports any combination of local and remote file systems, based on the file system mounts. The administrative infrastructure maintains the mount configuration for every node. Local file systems may be used when performance is critical. For example, application scratch space and on the service nodes for /bin, /lib, and other system files. The remote file system can be of any type supported by distributed processing system 100.

Distributed I/O virtualization module 303 (FIG. 3) within USSL module 222 implements a high-performance, scalable design to provide global, parallel I/O between I/O nodes 114 and system nodes 104 or application nodes 111. Similar to NFS, the implemented file system is "stacked" on top of any local file system present on all of the I/O nodes 112 in distributed processing system 100. Metadata, disk allocation, and disk I/O are all managed by the local file system. USSL module 222 provides a distribution layer on top of the local file system, which aggregates the local file systems of multiple I/O nodes 112 (i.e., system nodes 104 with I/O roles) into a single parallel file system and provides transparent I/O parallelization across the multiple I/O nodes. As a result, parallel I/O can be made available through the standard API presented by kernel 221, such as the standard Linux file API (open, read, write, close, and so on), and is transparent to application program 810. Parallelism is achieved by taking a single I/O request (read or write) and distributing it across multiple service nodes with I/O roles.

In one embodiment, any single I/O request is distributed to I/O nodes 112 in a round-robin fashion based on stripe size. For example, referring again to the example of FIG. 8, a read operation performed by application module 810 retrieves a data record from both I/O node 112A and I/O node 112B. One portion of the data record is stored in mass storage device 114A attached to I/O node 112A and a second portion of the data record is stored on mass storage device 114A' attached to I/O node 112B. Data records may be "striped" across a plurality of different I/O nodes 114 in this fashion. Each of the portions of the data record may be asynchronously retrieved with application node 111A requesting retrieval of the portions as separate read requests made to each corresponding I/O node 112A, 112B. These read requests may occur concurrently to decrease data retrieval times for the data records. Once all of the portions of the data records are received, the portions may be combined to create a complete data record for use by application module 810. A data write operation is performed in a similar manner as application node 111A divides the data record into portions that are separately written to I/O nodes 112A and 112B. The file system implemented by distributed processing system 100 does not require disks to be physically shared by multiple nodes. Moreover, the implemented file system may rely on hardware or software RAID on each service node with an I/O role for reliability.

In this manner, the use of USSL module 222 as a plug-in extension allows an I/O node, e.g., I/O node 112A, to project a file system across distributed processing system 100 to as many application nodes as mounted the file systems. The projecting node is a server that is usually a service node with an I/O role (i.e., an I/O node), and the nodes that mount the file system as clients can have any role or combination of roles assigned to them (e.g., application nodes or system nodes). The purpose of this "single I/O node" version of the implemented file system is to project I/O across the system. The single I/O node version is a subset of the implemented file system, which performs the same function, grouping several servers together that are treated as one server by the client nodes.

The "/node file system" allows access to every node's root (/) directory without having to explicitly mount every node's root on every other node in the system. Once mounted, the /node file system allows a global view of each node's root directory, including the node's /dev and /proc directories. On distributed processing system 100, which does not use a single global device name space, each node has its own local device name space (/dev). For example, /dev on node RED can be accessed from any node by looking at /node/RED/dev. The /node file system is made accessible by mounting the file system via the mount utility.

The "/gproc file system" aggregates all the processes in all nodes' /proc file system, allowing all process IDs from all the nodes in the system to be viewed from the /gproc file system. Opening a process entry in this file system opens the /proc file entry on the specified node, providing transparent access to that node's /proc information.

FIG. 8 illustrates a specific example of a series of I/O operations performed by application module 810, and begins with opening a file stored in a distributed file system. Initially, application module 810 issues I/O command 811, consisting of the open file command, to kernel 221 for processing. Kernel 221 recognizes the file reference to be part of a mounted distributed file system and, as a result, issues a subsequent I/O command 812 to USSL module 222.

The distributed I/O virtualization module 303 (FIG. 3) within USSL module 222 automatically performs the file open operation by generating and sending message 821 to corresponding USSL module 222' and USSL module 222" in I/O nodes 112A and 112B, respectively, requesting the file within their respective file systems be opened. While the file name reference used by application module 810 appears to be a logical file name within the distributed file system, distributed I/O virtualization module 303 is actually opening a plurality of files within the file systems of each I/O node 112A, 112B on which the data records are striped. The respective USSL modules 222', 222" pass the open file requests to their respective kernels 221' and 221", which open the files on behalf of application module 810.

Once these files have been opened, the logical file that consists of the separate files on mass storage devices 803 and 803' of I/O nodes 112A, 112B is available for use by application module 810. Application module 810 may read and write data records using a similar set of operations. When a read operation occurs, application module 810 transmits another I/O command 811 to kernel 221, which in turn transmits another corresponding I/O command 812 to USSL module 222. Distributed I/O virtualization module 303 within USSL module 222 identifies the I/O nodes 112A and 112B on which the portions of the data record to be read are located, and sends a series of concurrent I/O messages 821 to USSL module 222' and USSL module 222" to retrieve the various portions of the data record. In response, USSL modules 222', 222" retrieve and return their respective portion of the data record to USSL module 222. Distributed I/O virtualization module 303 automatically combines each portion of the data record to generate the complete data record which is passed through kernel 221 to application module 810.

I/O nodes 112A, 112B map the distributed file system across their respective mass storage devices 114A, 114B under the control of an administration node 102 (FIG. 1) at the time the I/O nodes are booted. In this manner, this file system mapping information for how data records are striped across multiple I/O nodes 112A, 112B is made available for all computing nodes within distributed processing system 100.

Figure 9:
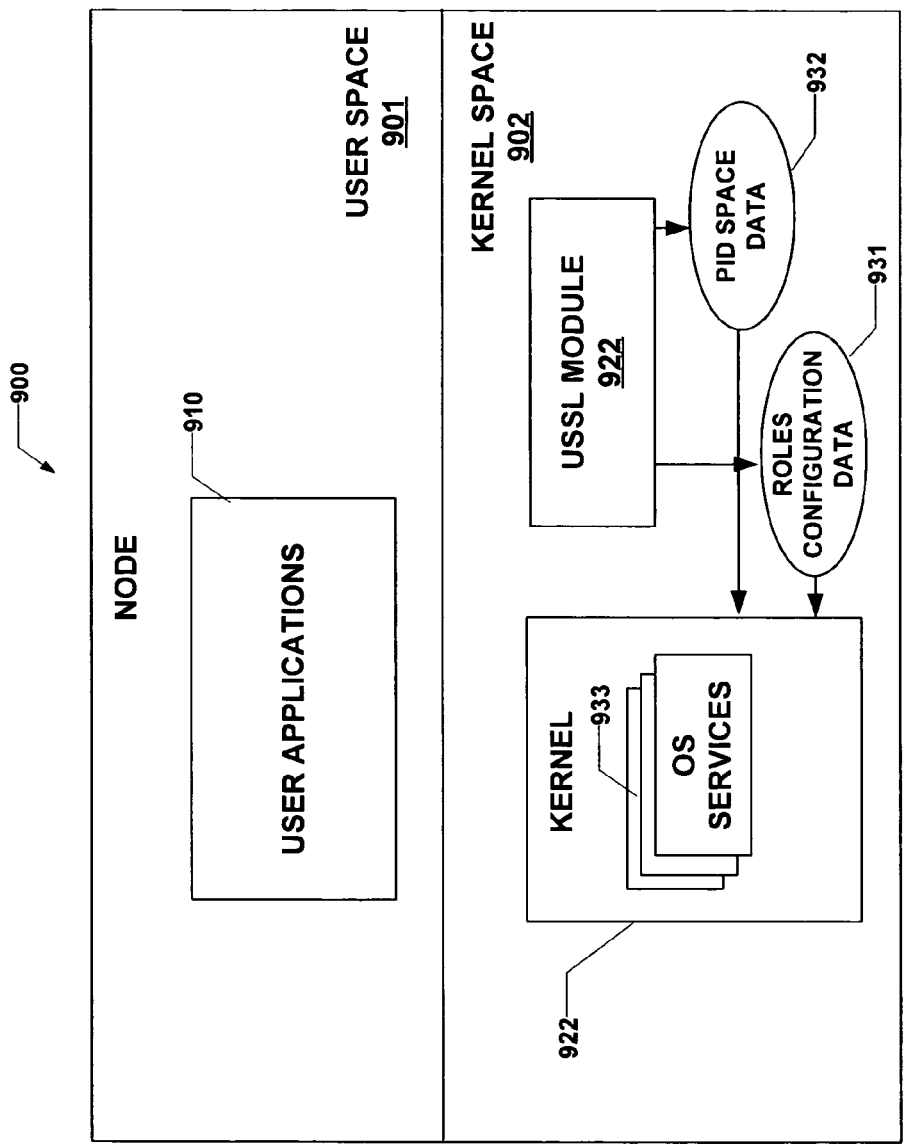
FIG. 9 is a block diagram illustrating a computing node for use in a plurality of processing roles within a distributed processing system according to the present invention.

FIG. 9 is a block diagram illustrating additional details for one embodiment of a computing node 900, which represents any application node 111 or system node 104 within distributed processing system 100. In particular, in this embodiment, computing node 900 illustrates a generic computing node and, more specifically, the components common to all nodes of system 100 regardless of computing role.

As discussed above, distributed processing system 100 supports "node-level" specialization in that each computing node may be configured based one or more assigned roles. As illustrated in node 900 of FIG. 9, in this embodiment each node within distributed processing system 100 contains a common set of operating system software, e.g., kernel 921. Selected services or functions of the operating system may be activated or deactivated when computing node 900 is booted to permit the computing node to efficiently operate in accordance with the assigned computing roles.

Computing node 900 provides a computing environment having a user space 901 and a kernel space 902 in which all processes operate. User applications 910 operate within user space 901. These user applications 910 provide the computing functionality to perform processing tasks specified by a user. Within kernel space 902, an operating system kernel 921 and associated USSL module 922 provide operating system services needed to support user applications 910.

In kernel space 902, operating system kernel 921 and related USSL module 922 operate together to provide services requested by user applications 910. As discussed in reference to FIG. 3, USSL module 922 may contain a processor virtualization module 301, a process virtualization module 302, and a distributed I/O virtualization module 303 that perform operations to provide file system and remote process communications functions within distributed processing system 100.

As illustrated in FIG. 9, kernel 921 includes a set of standard OS services module 933 to provide all other operating services within computing node 900. USSL module 922 updates PID space data 932 to contain a set of PIDs from the administration node 102 for use by computing node 900 creating a process on any computing node within system.

In addition, kernel 921 accesses roles configuration data 931 and PID space data 932 maintained and updated by USSL module 922. Roles configuration data 931 causes kernel 921 to operate in coordination with administration node 102 (FIG. 1) in distributed processing system 100. In particular, kernel 922 is configured in accordance with roles configuration data 931 to provide services needed to implement the assigned computing role or roles.

Using this data, computing node 900 may operate in any number of computing roles supported within distributed processing system 100. Each of these processing roles requires a different set of services that are activated when computing node 900 is booted. The inclusion and subsequent use of these operating system services within computing node 900 provide the functionality for computing node to operate as one or more of the system node roles or application node role discussed above.

Figure 10:
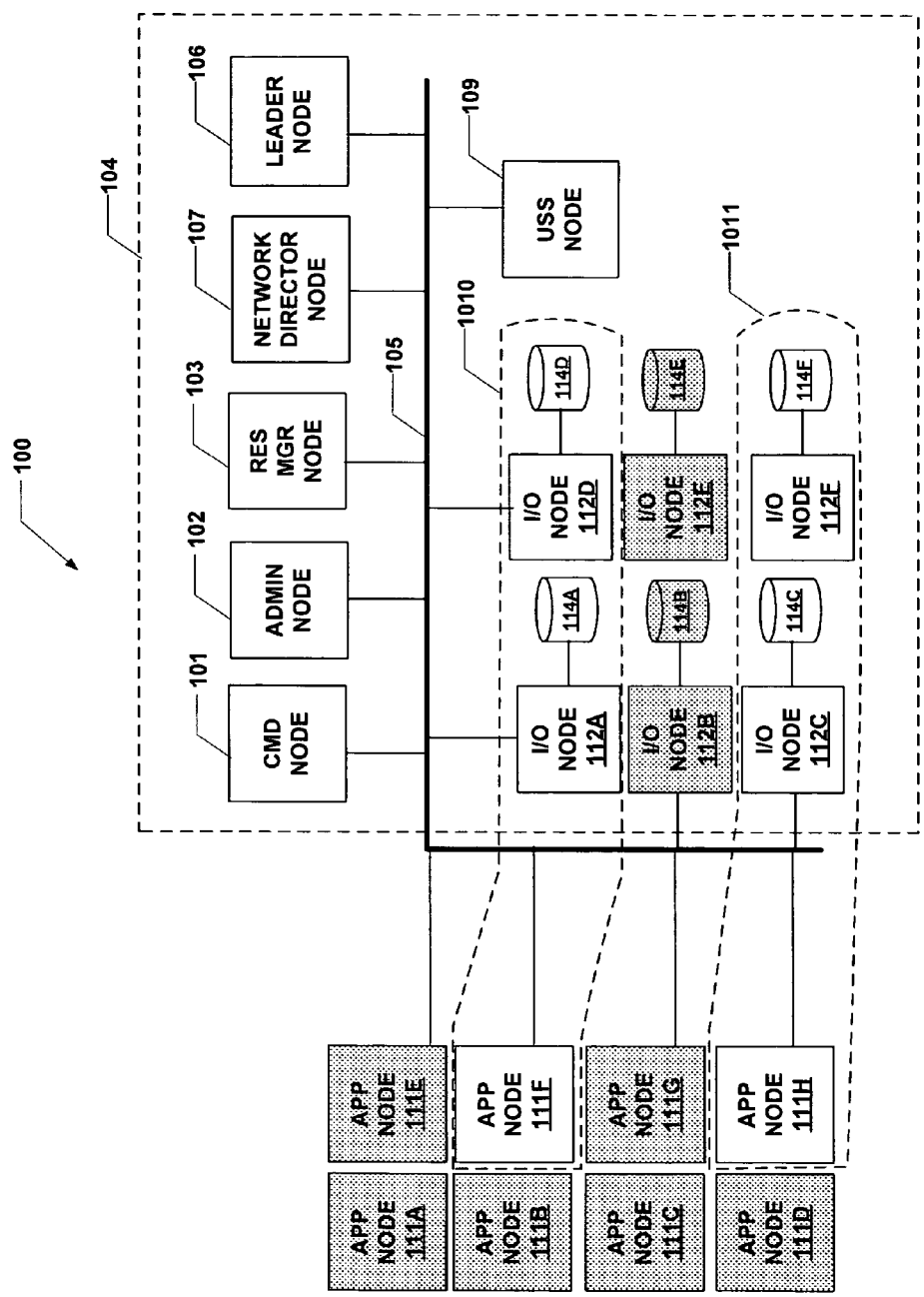
FIG. 10 is a block diagram illustrating a distributed processing system having a plurality of concurrently operating computing nodes of different processing roles according to the present invention.

FIG. 10 is a block diagram illustrating in further detail the node-specialization and role-based computing abilities of distributed processing system 100. The use of the different types of processing roles within distributed processing system 100 provides a level of isolation for the individual computing nodes from each other. This isolation may achieve increased operating efficiency of the computing nodes, and thus permit an increased level of scalability for system 100.

In other words, the use of processing roles may be viewed as a mechanism for providing computing resource isolation to reduce competition between different processes for particular resources within a computing node. For example, I/O nodes 112 within distributed processing system 100 provide access to data stored on attached mass storage devices 114 for application nodes 111. These I/O operations all utilize a common set of resources including the mass storage devices, system buses, communications ports, memory resources, and processor resources. The scheduling of operations to provide efficient data retrieval and storage operations may be possible if only I/O operations are being performed within the particular computing node. If I/O operations and other system operations, such as operations performed by a resource manager role or an administration role, are concurrently operating within the same node, different sets of resources and operations may be needed. As a result, the same level of efficiency for each computing role may not be possible as the computing node switches between these different roles.

The isolation that is provided through the use of computing roles also achieves a reduced reliance on "single points of failure" within distributed processing system 100. In particular, a given node's reliance on a single point of failure is reduced by separating roles across a plurality of identical nodes. For example, as illustrated in FIG. 10, consider two sets of isolated computing nodes: (1) a first set of nodes 1010 that includes application node 111F, I/O node 112A and I/O node 112D, and (2) a second set of nodes 1011 that includes application node 111H, I/O node 112C and I/O node 112F. In general, different user applications would be running on each of these different sets of nodes. Due to the isolation between the sets, if any one of the nodes in either the first set of nodes 1010 or the second set of nodes 1011 fails, the operation of the other set of nodes is not affected. For example, if I/O node 112A fails, the second set of nodes 1011 is still able to carry out its assigned applications. Additionally, the failed node may be replaced in some circumstances by another node in distributed processing system 100 that is configured to perform the same computing role as the failed computing node.

Moreover, if a system node, such as resource manager node 103, fails, all other nodes in distributed processing system 100 will continue to operate. New requests for computing nodes needed to launch a new application cannot be allocated while the resource manager node 103 is inoperable. However, a different computing node within distributed processing system 100 may be activated to perform the role of a resource manager node. Once the new resource manager node is operating and has obtained process status information used by the resource manager role to allocate nodes to new processes is obtained from all active nodes in the system, the new node may continue operation of system 100 as if the resource manager node had not failed. While this recovery process occurs, existing processes running on computing nodes in distributed processing system 100 continue to operate normally. Similar results may be seen with a failure of all other computing nodes. Because most status information used in system nodes, such as administration node 102 and resource manager node 103 is replicated throughout the computing nodes in distributed processing system 100, currently existing nodes of all types may continue to operate in some fashion using this locally maintained information while a failure and subsequent recovery of a particular node occurs.

In this manner, this node specialization and isolation of nodes into roles supports an increase in the scalability of functions within distributed processing system 100. Whenever additional processing resources of a particular type are needed, an additional node of the needed type may be added to system 100. For example, a new process may be launched on a new application node 111 when additional application processing is needed. Additional I/O capacity may be added in some circumstances by adding an additional I/O node 112. Some system nodes, such as a command node 101, may be added to support additional user interaction. In each case, the use of plug-in USSL module 922 with a conventional operating system, such as Linux, allows additional nodes to easily be used as any computing nodes of a particular computing role merely by booting a generic computing node into a particular computing role.

Figure 11:
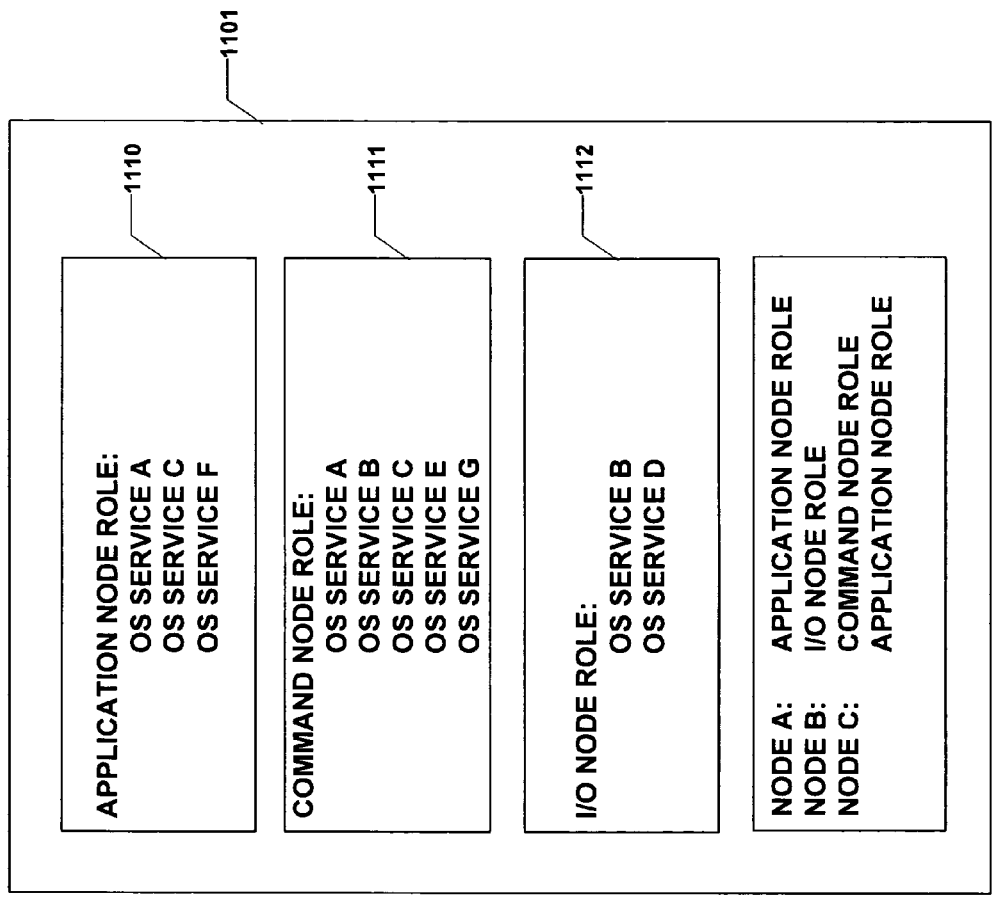
FIG. 11 is a block diagram of a configuration data store having configuration data associated with various processing roles used within a distributed processing system according to the present invention.

FIG. 11 is a block diagram of a configuration data store (e.g., database) 1101 having role data defining various processing roles used within distributed processing system 100. As noted above, a computing role is implemented by activating of a particular set of system services when a computing node is booted. For each type of computing role in distributed processing system 100, a defined set of services are typically known and specified within configuration data store 1011.

More specifically, within configuration data store 1101, a data entry exists for each type of computing role supported within distributed processing system 100. In the example embodiment of FIG. 11, configuration data store 1101 includes an application node data entry 1110, a command node data entry 1111, and an I/O node data entry 1112. For each particular data entry, a specific list of operating system services is listed. This list of services specified by each data entry controls the services that are launched when a particular computing node is booted. Although not shown, data store 1101 may have entries for each node of distributed processing system 100 and, for each node, associate the node with one or more of the defined roles. In this manner, configuration data store 1101 controls the services executing by application nodes 111, command node 101, I/O nodes 112, administration node 102, resource manager node 103, leader node 106, network director node 107, USS node 109 and any other type of node in distributed processing system 100.

The following sections describe in further detail one example embodiment in which operating system services provided by a node are selectively enabled and disabled in accordance with the one or more roles associated with the node. As noted above, kernel 221 may be a version of Linux operating system in one example embodiment. In this example embodiment, Red Hat Linux 7.3 for IA32 systems from Redhat, Inc., of Raleigh, N.C., is described for use as kernel 221. Consequently, the operating system services provided by kernel 221 that are selectively turned on or off based on the one or more roles assigned to a computing node correspond to well-known operating system services available under Linux. As discussed below, a specific mapping of services enabled for each type of computing node role is defined, and each computing node in distributed processing system 100 is assigned one or more roles.

The following tables and explanations show the node-specialization process, and list the services that are ultimately enabled for each defined node role. Table 1 does not show every system service, but only those services that are enabled after the installation or configuration process has completed, and reflects the system services as defined, for example, in a /etc/rc.d/init.d/ directory as defined in Red Hat Linux 7.3.

In this example, Table 1 defines the system services that are initially enabled after a base Linux installation. In particular, column 1 defines the Linux system services that are enabled after a base Linux distribution installation. Column 2 defines the Linux system services that are enabled after an Unlimited Linux installation. Column 3 defines the Linux system services that are enabled after the initial Unlimited Linux configuration tasks are completed, but before the roles are assigned to the nodes in system 100. In columns 2 and 3, the services specific to the Unlimited Linux system are called out in bold font; see Table 2 for a description of these services.

TABLE 1

Base Linux installation

| Base Linux | Unlimited Linux | Unlimited Linux prior to role assignment |
|---|---|---|
| anacron | anacron | dhcpd |
| apmd | apmd | dmond |
| atd | atd | dnetwork |
| autofs | autofs | kudzu |
| crond | crond | mysqld |
| gpm | gpm | netfs |
| ipchains | ipchains | network |

TABLE 1-continued

Base Linux installation

| Base Linux | Unlimited Linux | Unlimited Linux prior to role assignment |
|---|---|---|
| iptables | ipforward | nfslock |
| isdn | ipleader | ntpd |
| keytable | iptables | portmap |
| kudzu | isdn | random |
| lpd | keytable | sshd |
| netfs | kudzu | uss |
| network | lpd | syslog-ng |
| nfslock | netfs | xinetd |
| portmap | network | ypbind |
| random | nfslock | |
| rawdevices | portmap | |
| sendmail | random | |
| sshd | rawdevices | |
| Syslog | sendmail | |
| xfs | sshd | |
| xinetd | uss service | |
| | syslog-ng | |
| | xfs | |
| | xinetd | |

TABLE 2

Unlimited Linux service descriptions

| Unlimited Linux system service | Description |
|---|---|
| dhcpd | Starts and stops DHCP. |
| Dmond | Starts the Unlimited Linux monitoring daemon. |
| dmonp | Starts the Unlimited Linux monitor poller. |
| dnetwork | Activates and deactivates all network functionality related to load balancing (LVS) and network address translation (NAT). |
| eth-discover | Configures Ethernet interfaces. |
| gm | Myrinet GM service. |
| ipforward | Enables IP forwarding. |
| ipleader | Configures the well-known IP alias network interfaces on nodes with leader roles. |
| Mysqld | Starts and stops the MySQL subsystem. |
| nfs.leader | User-level NFS service. |
| ntpd | Starts and stops the NTPv4 daemon. |
| qsnet | QsNet service |
| uss service | Starts uss for the node with the administration role |
| sylog-ng | Starts syslog-ng. syslog-ng is used by many daemons use to log messages to various system log files. |
| ypbind | Starts the ypbind daemon. |

During the final stage of system configuration, the USSL module selectively enables and disables the system services based on the type of system interconnect that is used on the system, and by the role or roles assigned to a node. Table 3 lists the Linux system services that are further modified based on the role that is assigned a node. In one embodiment, the roles are processed in the ordered shown in Table 3 because the nfs and nfs.leader services are not compatible.

TABLE 3

System services as defined by assigned role

| Role | Services turned on/off |
|---|---|
| Application | uss on |
| | eth-discover on if system interconnect is Ethernet. |
| Command | uss on |
| | eth-discover on |
| Resource manager | uss on |
| | eth-discover on if system interconnect is Ethernet. |

TABLE 3-continued

System services as defined by assigned role

| Role | Services turned on/off |
| --- | --- |
| Network director | eth-discover on |
| Network I/O | nfs off |
| | nfs.leader on |
| | eth-discover on |
| | uss on |
| File system I/O | nfs.leader off |
| | nfs on |
| | uss on |
| | eth-discover on if system interconnect is Ethernet. |
| Leader | nfs off |
| | nfs.leader on |
| | dmonp on |
| | dhcpd on |
| | ipforward on |
| | ipleader on |
| | eth-discover on |
| Admin | ipleader off |
| | eth-discover off |
| | nfs.leader off |
| | nfs on |

After the Linux installation and configuration process is completed, the Linux system services that are enabled for a particular computing node is generally the set of services shown in column 3 of Table 1 as modified by the results of Table 3 and the disabling of the eth-discover, ipleader, and uss services before the role modifications are made.

For example, a computing node that is assigned the leader computing role 106 would have all of the services in column 3 of Table 1, plus the nfs.leader, dmonp, dhcpd, ipforward, ipleader, and eth-discover services on, and uss off. In this leader node 106, the nfs service is turned off, even though it is already off, while dhcpd is turned on even though it is already on as indicated in column 3 of Table 1, respectively. This procedure is utilized to ensure that correct system services are on when a computing node has more than one role assigned to it. If a computing node has combined roles, the sets of services defined in Table 3 are logically ORed. For example, if a particular computing node has both a leader node role 106 and a command node role 101 assigned to it, the set of role modified system services on this node would be as follows: uss on, nfs off, nfs.leader on, dmonp on, dhcpd on, ipforward on, ipleader on, and eth-discover on.

While the example embodiment illustrated herein utilizes Red Hat Linux 7.3 system services, other operating systems may be used by enabling corresponding operating system services typically supported by well-known operating systems without departing from the present invention.

Figure 12:
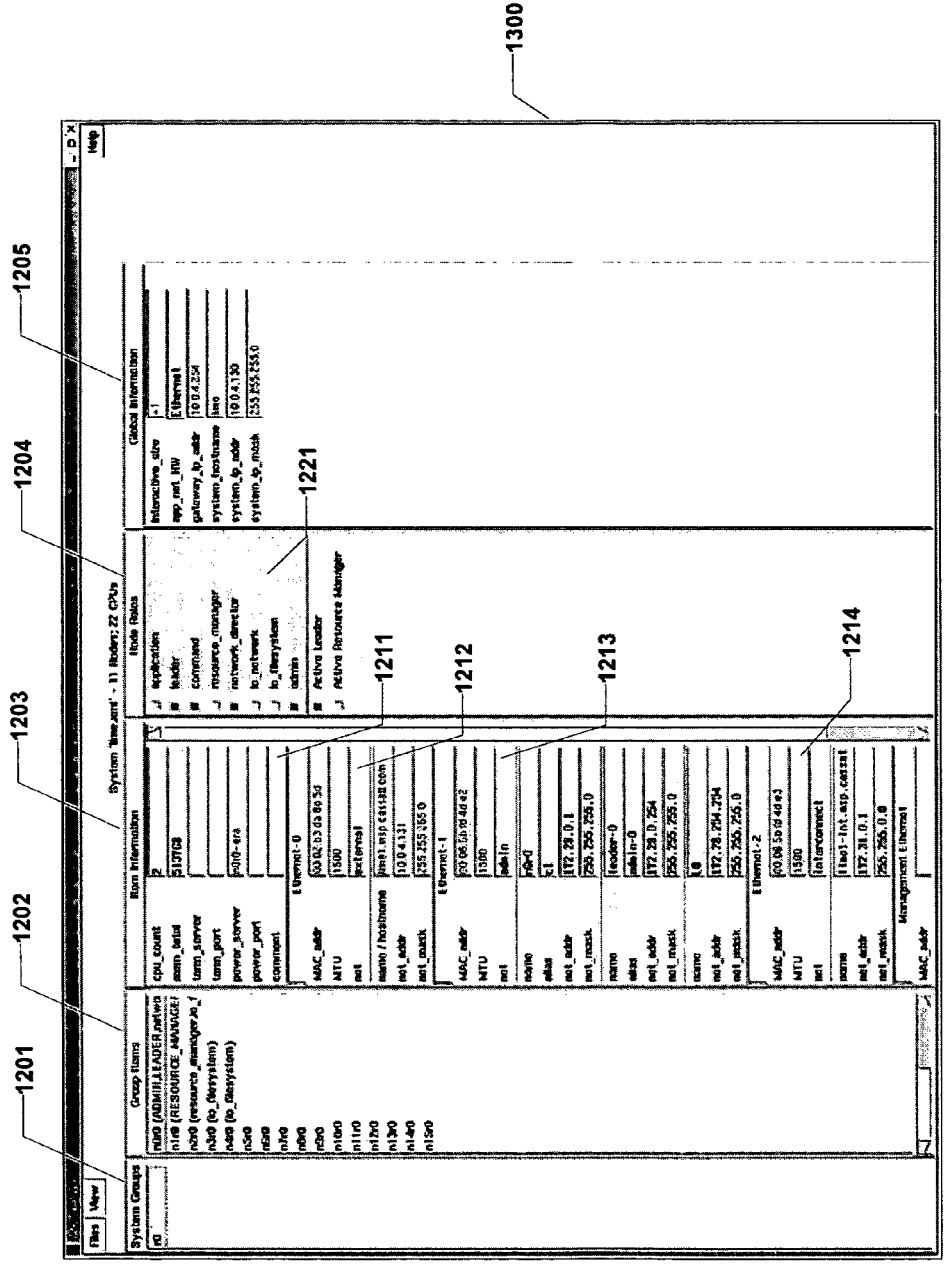
FIG. 12 is a diagram that illustrates an example computer display for a system utility to configure computing nodes into various computing node roles according to the present invention.

FIG. 12 illustrates an example computer display presented by a system utility for configuring computing nodes into various computing node roles according to the present invention. Distributed processing system 100 may include a node configuration utility application 1200 that permits a user to configure computing nodes in the system to perform various computing node roles. Configuration utility application 1200 typically executes on a computing node performing a system node role, such as administration node 102.

In one example embodiment, configuration utility application 1200 provides a user with a set of control columns that permit the configuration of one of the computing nodes in the system. The control columns include a system group column 1201, a group items column 1202, an item information column 1203, a node role column 1204, and other information column 1205. Users interact with control options shown in each column to configure the specific node-level roles assigned to a computing node.

System group column 1201 provides a listing of all groups of computing nodes available within distributed processing system. Users select a particular group of nodes from a list of available groups for configuration. When a particular group is selected, the group item column 1202 is populated with a list of computing nodes contained within the selected group of nodes. Group items column 1202 permits a user to select a particular computing node within a selected group for configuration. A selects a node from the list of available nodes to specify computing node parameters listed in the remaining columns.

Item information column 1203 provides a user with a list of computing resources and related resource parameter settings used by the computing node during operation. In the example of FIG. 12, the list of computing resources 1203 includes an entry for processor information for the particular computing node 1210 and a plurality of entries for each network connection present in the particular computing node 1211-1213. Processor information entry 1210 provides useful system parameter and resource information for the processors present within the selected computing node. Each of the network connection entries 1211-1213 provides network address and related parameter information for each respective network connection available in the selected computing node. Users may view and alter these system parameters to configure the operation of the selected computing node.

Node role column 1204 provides a list of available computing node roles 1221 present within distributed processing system 100. A user may configure the selected computing node to perform a desired computing node role by selecting a checkbox, or similar user interface selection control from the list of available roles 1221. Configuration utility application 1200 may provide an entry in the list of available roles 1221 that may be supported by the set of computing resources available in a node. For example, an I/O node may not be included within the list of available roles 1221 if necessary storage devices are not attached to the selected computing node. Once a user selects a desired computing node role and alters any parameters as needed, configuration utility application 1200 passes necessary information to the selected computing node to reconfigure the computing node as specified. The needed configuration information may be obtained from a template used for each type of computing node role available within system 100.

Configuration utility application 1200 includes other information column 1205 to provide any other useful system parameters, such as network gateway IP addresses, and other network IP addresses that may be known and needed in the operation of the selected computing node. Configuration utility application 1200 may pre-configure the system parameters to desired values and may prohibit a subset of parameters from being altered under user control to minimize conflicts within various computing nodes of system 100. Particularly, IP addresses for computing node connections, network gateways, and related values may not be available for altering by individual users as the alteration of these parameters may cause conflict problems with other computing nodes within the system. Any well known user level authorization mechanism may be used to identify users who may and users who may not alter individual parameters using configuration utility application 1200.

Various embodiments of the invention have been described. These and other embodiments are within the scope of the following claims.

The invention claimed is:

1. A distributed processing system having a plurality of computing nodes coupled by a network, wherein each of the computing nodes comprises:
one or more programmable processors for executing instructions;
one or more software processes executing on the one or more programmable processors within an execution environment provided by an operating system kernel for a general-purpose operating system; and
a plug-in software module for the general-purpose operating system executing on the one or more programmable processors and within the kernel space of the general-purpose operating system, wherein the plug-in software module of the general-purpose operating system extends the general-purpose operating system to provide a distributed memory operating system having a single process execution space that spans the computing nodes of the distributed processing system,
wherein the plug-in software module comprises a process virtualization module for the operating system kernel, wherein the process virtualization module defines a global process identifier (PID) space across the computing nodes, assigns a first unique range of process identifiers within the global PID space to a first computing node, and assigns a second unique range of process identifiers within the global PID surface to a second computing node,
wherein the first computing node assigns a PID from the first unique range of process identifiers to a first software process, and the second computing node assigns a PID from the second unique range of process identifiers to a second software process such that any of the one or more software processes can determine which computing node launched the first software process and the second software process,
wherein the first computing node launches the first software process on a third computing node, and wherein the second computing node launches the second software process on a fourth computing node.

2. The distributed processing system of claim 1, wherein the plug-in software module of the general-purpose operating system provides an inter-process communication mechanism between each computing node.

3. The distributed processing system of claim 1, wherein the general-purpose operating system is a lightweight operating system that is optimized based on the functionality of the respective computing node.

4. The distributed processing system of claim 1, wherein the general-purpose operating system is the Linux operating system.

5. The distributed processing system of claim 1, wherein the plug-in software module communicates with a software hook installed within the operating system and is invoked by the operating system when the operating system receives requests from the software processes.

6. The distributed processing system of claim 1,
wherein the first computing node automatically assigns a process identifier selected from the first unique range of process identifiers to the first software process.

7. The distributed processing system of claim 1,
wherein each of the nodes comprises a software module for communicating between software processes executing on the nodes,
wherein the software module receives a messaging request directed to a target one of the software processes, and identifies one of the nodes that launched the target software process based on a process identifier specified within the request, and
wherein the software module issues the messaging request to the identified node for forwarding to the software module.

8. The distributed processing system of claim 1, wherein the process virtualization module communicates the range of the process identifiers to the operating system kernel for use when the operating system kernel launches one or more of the software processes on any of the computing nodes.

9. The distributed processing system of claim 1, further comprising:
at least one network interconnect software module; and
a transport application programming interface (API) that provides a mechanism for sending and receiving communications between the process virtualization module and other computing nodes in the distributed processing system.

10. The distributed processing system of claim 1, further comprising a two-way application programming interface (API) for communications to flow between the operating system kernel and the process virtualization module.

11. The distributed processing system of claim 1, wherein the plug-in software module further comprises a distributed I/O virtualization module that provides a distributed file system for the distributed processing system.

12. A method comprising:
installing plug-in software modules on nodes of a distributed processing system, wherein each of the plug-in software modules is installed within a general-purpose operating system that provides an execution environment for software processes executing on the respective node;
executing the plug-in software modules within kernel spaces of the nodes to extend the general-purpose operating system on each of the nodes to provide a distributed memory operating system having a single process execution space that spans the nodes of the distributed processing system, wherein executing the plug-in software modules within kernel spaces of the nodes comprises:
defining a global process identifier (PID) space across the nodes;
assigning, with one or more process virtualization modules, a unique range of process identifiers within the global PID space to each of the nodes in the distributed processing system, wherein assigning, with the one or more process virtualization modules, the unique range of process identifiers comprises assigning a first unique range of process identifiers within the global PID space to a first node, and assigning a second unique range of process identifiers within the global PID surface to a second node; and
assigning to each of one or more software processes a process identifier selected from the range assigned to a node that launched the respective software process such that any of the one or more software processes can determine which node launched the respective software process, wherein assigning to each of the one or more software processes the process identifier selected from the range assigned to the node that launched the respective software process comprises:
assigning, with the first node, a PID from the first unique range of process identifiers to a first software process,
launching, with the first node, the first software process on a third node, assigning, with the second node, a PID from the second unique range of process identifiers to a second software process, and launching, with the second node, the second software process on a fourth node.

13. The method of claim 12, further comprising providing an inter-process communication mechanism between each node with the plug-in software modules.

14. The method of claim 13, further comprising receiving with the plug-in software module communications from a software hook installed within the operating system; and invoking the inter-process communication mechanism in response to the communication to forward the communications between the nodes.

15. The method of claim 12, wherein the general-purpose operating system for each node is a lightweight operating system that is optimized based on the functionality of the respective node.

16. The method of claim 12, wherein the general-purpose operating system is the Linux operating system.

17. The method of claim 12, further comprising:

launching one of the software processes with a first one of the nodes on a second one of the nodes;

selecting a process identifier from the unique range of process identifiers assigned to the first one of the nodes; and assigning the processor identifier to the launched process with the second one of the nodes.

18. The method of claim 12, further comprising installing the plug-in software modules to extend the operating system to provide a distributed file system for the distributed processing system.

19. The distributed processing system of claim 1, wherein the third computing node and the fourth computing node are the same computing node.

20. The method of claim 1, wherein the third node and the fourth node are the same node.

* * * * *